United States Patent
Wong et al.

(10) Patent No.: US 10,668,431 B1
(45) Date of Patent: Jun. 2, 2020

(54) FREE-STANDING LIQUID MEMBRANES FOR SUBSTANCE SEPARATION, FILTRATION, EXTRACTION, AND BLOCKAGE

(71) Applicant: The Penn State Research Foundation, University Park, PA (US)

(72) Inventors: Tak-Sing Wong, Penn State, PA (US); Birgitt Boschitsch, Penn State, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 16/495,237

(22) PCT Filed: Apr. 26, 2018

(86) PCT No.: PCT/US2018/029565
§ 371 (c)(1),
(2) Date: Sep. 18, 2019

(87) PCT Pub. No.: WO2018/200808
PCT Pub. Date: Nov. 1, 2018

Related U.S. Application Data

(60) Provisional application No. 62/490,068, filed on Apr. 26, 2017.

(51) Int. Cl.
*B01D 61/38* (2006.01)
*B01D 69/02* (2006.01)
*B01D 53/22* (2006.01)

(52) U.S. Cl.
CPC ............ *B01D 61/38* (2013.01); *B01D 53/228* (2013.01); *B01D 69/02* (2013.01); *B01D 2325/24* (2013.01)

(58) Field of Classification Search
None
See application file for complete search history.

(56) References Cited

U.S. PATENT DOCUMENTS

| 3,389,078 A | 6/1968 | Elzinga et al. | |
| 5,603,953 A * | 2/1997 | Herbig | A61K 9/009 424/451 |
| 2002/0167639 A1 * | 11/2002 | Coates | B29C 33/68 349/187 |

(Continued)

OTHER PUBLICATIONS

Ban et al. "Transient Pore Dynamics in pH-Responsive Liquid Membrane" Langmuir, vol. 28, Issue 29 (Jun. 22, 2012); pp. 10682-10687; abstract, p. 10683, col. 1, para. 1, p. 10683 col. 1, para. 3, fig. 2.

(Continued)

*Primary Examiner* — Chester T Barry
(74) *Attorney, Agent, or Firm* — Buchanan Ingersoll & Rooney PC

(57) ABSTRACT

A free standing liquid membrane is disclosed that can selectively separate objects based on the kinetic energy value of the objects such that either an object having a first kinetic energy value can pass through the free standing liquid membrane while retaining the membrane and/or an object having a second kinetic energy value is prevented from passing through the membrane while retaining the membrane. Advantageously, the free standing liquid membrane can remain intact for seconds to hours with multiple objects passing through the membrane.

13 Claims, 5 Drawing Sheets

(56) References Cited

U.S. PATENT DOCUMENTS

| | | | |
|---|---|---|---|
| 2009/0065450 A1* | 3/2009 | Tomlinson | B01D 29/05 |
| | | | 210/806 |
| 2009/0301297 A1 | 12/2009 | Littau | |
| 2015/0294800 A1* | 10/2015 | Kim | H01G 11/48 |
| | | | 361/502 |
| 2017/0050143 A1 | 2/2017 | Li et al. | |
| 2018/0068756 A1* | 3/2018 | Watt | H01L 31/1884 |

OTHER PUBLICATIONS

International Search Report for PCT/US2018/029565 dated Jul. 10, 2018.

Written Opinion of the International Searching Authority for PCT/US2018/029565 dated Jul. 10, 2018.

* cited by examiner

FREE-STANDING LIQUID MEMBRANES FOR SUBSTANCE SEPARATION, FILTRATION, EXTRACTION, AND BLOCKAGE

CROSS-REFERENCE TO RELATED APPLICATION

This application is the U.S. national stage application of International Patent Application No. PCT/US2018/029565, which claims the benefit of U.S. Provisional Application No. 62/490,068 filed 26 Apr. 2017 the entire disclosure of which is hereby incorporated by reference herein.

STATEMENT REGARDING FEDERALLY SPONSORED RESEARCH

This invention was made with government support under Grant Nos. CMMI1351462 and DGE1255832 awarded by the National Science Foundation. The Government has certain rights in the invention.

TECHNICAL FIELD

The present disclosure relates to free-standing liquid membranes and use thereof for selective separation, extraction, and blockage, and is particularly useful for applications in which relatively large objects pass through the membrane while small objects axe prevented from passing through the membrane or are retained. Such applications include, for example, low-cost clean surgery, waste odor management, insect barrier, contaminant extraction, molecular sensing, etc.

BACKGROUND

For centuries, particle separation has been a process of great significance. Today, its importance spans across several fields ranging from medical diagnostics to wastewater treatment and water desalination. Some of the simplest separation techniques are sieving and filtration—processes that rely on membranes that allow certain particles to pass through while preventing the passage of others. Conventional membranes are porous and allow particles smaller than a typical pore size to pass through while retaining those larger than the pore size. Membranes that allow relatively large particles to pass through while retaining smaller ones, however, are counterintuitive and uncommon. While unusual in human practice, membranes with such capabilities are readily found in nature. Cells, for example, are encased by a phospholipid bilayer comprised of amphiphilic molecules that can dynamically reconfigure themselves. This property, in conjunction with other biological mechanisms, makes possible the engulfment of large particles without fluid exchange as exemplified by endocytosis.

As displayed in nature, membranes that allow large particles to pass while retaining small ones must be dynamically reconfigurable and self-healing—properties commonly exhibited by liquids. While liquids possess many unique materials properties, membrane engineering efforts have predominantly focused on solid-based materials. In recent years, the concept of incorporating liquids into solid-based materials has led to breakthrough surface technologies. For example, the incorporation of stable liquid layers into porous solids allows for self-healing, robust liquid-repellency, anti-biofouling, anti-icing, and even gating properties.

A number of references report use of liquid membranes or pseudo-liquid membranes for separating components based on the chemical attributes of such components. For example, articles to Naito and Li disclose use of polymeric membranes characterized as pseudo-liquids for separating components based on the chemical attributes of such components. See Naito et al., "Polymeric pseudo-liquid membranes from poly(2-ethylhexyl methacrylate)", Polymer Journal, Vol. 41, No. 11. pp. 1005-1010, 2009; Li et al., "CO2 Separation from Flue Gas Using Polyvinyl—(Room Temperature Ionic Liquid)—Room Temperature Ionic Liquid Composite Membranes", Ind. Bag. Chem. Res. 2011, 50, 9344-9353; U.S. Pat. No. 9,403,190 which discloses a liquid membrane with solid particles. However, a need still exists for separation of components that do not depend substantially on chemical attributes of the components.

SUMMARY OF THE DISCLOSURE

An advantage of the present invention is a free standing liquid membrane that can withstand repeated perturbations to allow certain object to pass through the membrane and/or prevent certain other objects from passing through the membrane.

These and other advantages are satisfied, at least in part, by a free-standing liquid membrane comprising at least one liquid and at least one surfactant. The membrane can selectively separate objects based on the first kinetic energy value of the objects. For example, processes can include selectively separating objects by passing a first object having a first kinetic energy value through a free standing liquid membrane while retaining the membrane; and/or preventing a second object having a second kinetic energy value from passing through the membrane while retaining the membrane. In certain implementations, the process includes passing the first object through the free standing liquid membrane while retaining the membrane to prevent the second object from passing through the membrane. In other implementations, the processing includes preventing the second object from passing through the free standing liquid membrane while passing the first object through the free standing liquid membrane while retaining the membrane. Advantageously, the processes include passing multiple objects through the free standing liquid membrane and/or preventing multiple objects from passing through the free standing liquid membrane while maintaining the membrane.

Embodiments include one or more of the following features individually or combined. For example, the liquid component of the free standing liquid membrane can be replenished while the membrane is intact. In some embodiments, the free standing liquid membrane can remain intact for seconds to hours with multiple objects passing through the membrane. In other embodiments, the free-standing liquid membrane can include an additive.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 1a schematically compares architectures of different membranes; FIG. 1b illustrates how solid membranes separate particles; and FIG. 1c illustrates how a free-standing liquid membrane can separate objects such as particles.

FIG. 2a is an overlay image of beads dropped onto a free-standing liquid membrane and FIG. 2b shows data from such experiments. The scale bar represents 1 cm.

FIG. 3a is plot showing certain types of organisms and other objects as s function of whether they would pass through a free standing liquid membrane; FIG. 3b shows images of flies passing through free standing liquid membranes; and FIG. 3c shows images of flies retained by free standing liquid membranes. All scale bars represent 1 cm.

DETAILED DESCRIPTION OF THE DISCLOSURE

The present disclosure relates to free standing liquid membranes and their use in selectively separating objects based on the kinetic energy value (e.g., the product of mass and velocity squared) of a given object. In practicing an aspect of the present disclosure, a first object having a first kinetic energy value can pass through a free standing liquid membrane while retaining the membrane to prevent a second object having a second kinetic energy value from passing through the membrane. The first kinetic energy value of the first object is greater than the second kinetic energy value of the second object. Advantageously, the free-standing liquid membrane comprises at least one liquid and at least one surfactant. Also, one or more additives can be included in the membrane to help retain the liquid.

Figures 1A, 1B, 1C:
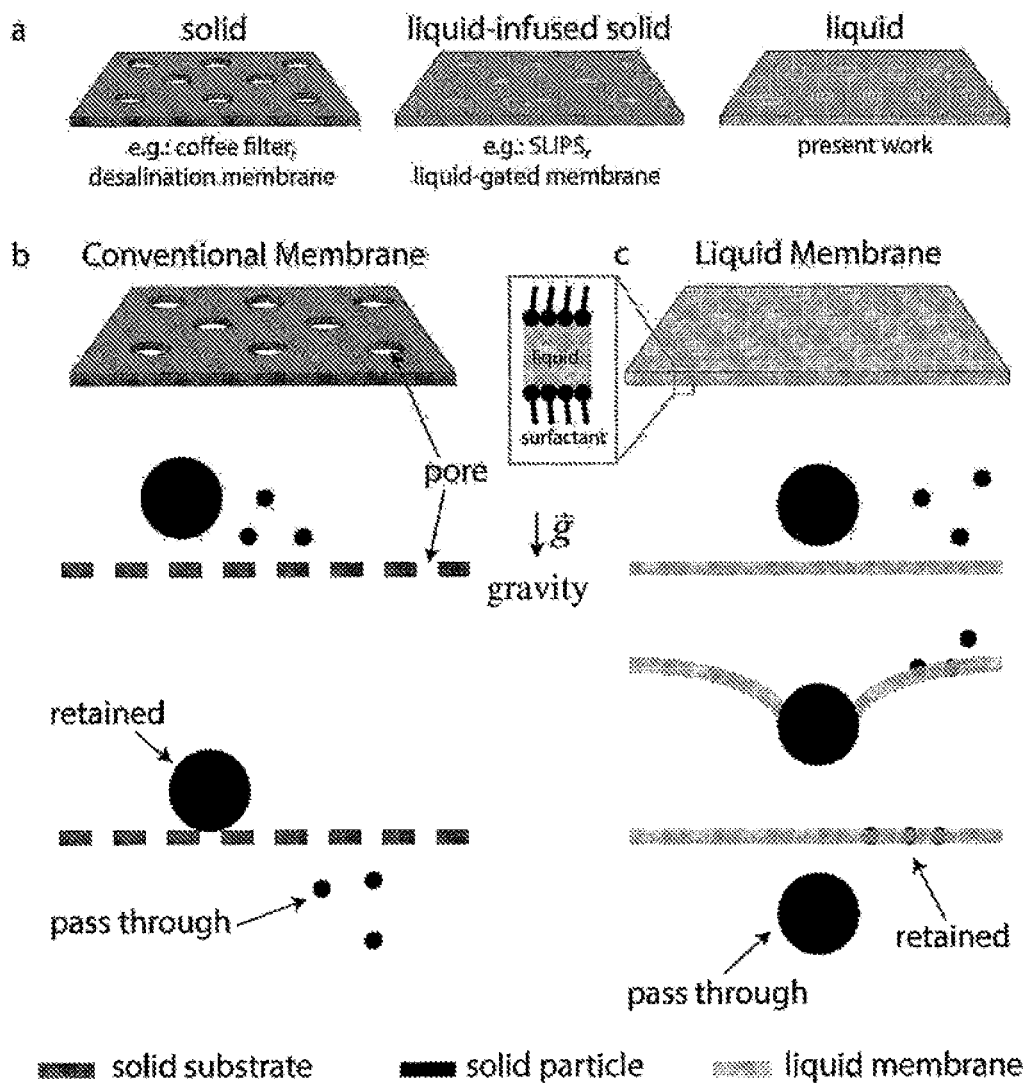
FIGS. 1a, 1b and 1c schematically illustrate different membrane architecture.

Despite the unique materials properties of liquids (e.g., rapid self-healing), the concept of using membranes comprised substantially or even entirely of one or more liquids as functional materials has remained unexplored. FIGS. 1a-1c are provided to aid in an understanding between differences of various membrane architecture. Figure a schematically compares architectures based on solid membranes, liquid-infused porous materials (e.g., slippery liquid-infused porous surfaces, or SLIPS), and free standing liquid membranes and FIG. 1b illustrates how solid membranes utilize porous geometries to allow small particles to pass through the solid membrane while mechanically inhibiting the passage of large particles. FIG. 1c, on the other hand, illustrates how a free-standing liquid membrane in an embodiment of the present disclosure can separate objects such, as particles. As shown in FIG. 1c, a free-standing liquid film can rely on a different mechanism for separation and allow for reversed separation behavior, e.g., small particles can be retained while large ones passing through the liquid membrane. FIG. 1c shows that a free-standing membrane, which in this case is comprised purely of liquids, can achieve particle separation regimes that cannot be attained by conventional membrane technologies (compare FIGS. 1b and 1c). As illustrated in FIG. 1c, a first object having a first kinetic energy value can pass through the free standing liquid membrane. The membrane is retained because it self-heals after the first object passes through the membrane. Small objects having a smaller kinetic energy value, however, am prevented from passing through the membrane.

By tuning the membrane surface tension and geometric parameters, one can design a membrane that can retain particles smaller than a critical size based on the particle inertial properties. Further, we have demonstrated that the unique properties of liquid membranes allow for applications that were previously unachievable by conventional membrane technologies, including entrapment of microscopic entities while allowing passage of macroscopic objects and selective gas-solid separation where the membrane allows solids to pass through while preventing gas passage.

Broadly, a free-standing liquid membrane can be comprised of at least one liquid and at least one surfactant. The liquid membrane can also include one or more additives, which helps retain the liquid. The surfactant and/or additive can be in liquid form or dissolvable in the liquid component of the membrane. Preferably, the free-standing liquid membrane is comprised substantially of one or more liquids, i.e., the free standing liquid membrane can be composed of at least about 95 wt % of one or more liquids such as at least 97.0 wt %, 98.2 wt %, 98.6 wt %, 99.7 wt %, or even entirely of one or more liquids.

The simplest form of a free-standing liquid membrane can be a surfactant-stabilized water layer (i.e., soap films). More specifically, the liquid component can be any aqueous fluids, and the surfactant can be any anionic or nonionic molecules comprised of a hydrophobic end group and a hydrophilic head group that can form the free-standing liquid membrane. Such surfactants include, for example, sodium dodecyl sulfate, sodium stearate, ammonium lauryl sulfate, alkylbenzene sulfonates, fatty alcohol ethoxylates, alkylphenol ethoxylates, sodium laureth sulfate, sodium myreth sulfate, glycerol monostearate, perfluorooctanesulfonate, perfluorobutanesulfonic acid, perfluoronoanoic acid, perfluorooctanoic acid, perfluorononanoate, perfluorooctanoate, emulsan, sophorolipid, rhamnolipids, etc. An array of additives can also be included in the free-standing membranes of the present disclosure. Such additives include hygroscopic agents, antiseptics, fragrances, entirely edible components, etc. which can be incorporated into the liquid solution with examples such as sugar, guar gum, sodium bicarbonate, ethanol, hydrogen peroxide, iodine, polyhexanide, glycerol, polyethylene glycol, poly(ethylene oxide), carboxymethylcellulose, citric acid, tannic acid, benzyl salicylate, citral, citronellol, citronellal, menthol, and others. This is not an exhaustive list of surfactants and additives.

In typical atmospheric conditions and near room temperatures, a simple liquid membrane can be comprised of deionized water and sodium dodecyl sulfate with concentrations of from about 1.9 mM to greater than about 82.0 mM. Glycerol can be added to increase the longevity of these liquid membranes. Free-standing liquid membranes can have various forms, the simplest of which may be a bubble or a film confined by a solid boundary. In addition, a reservoir can be included with a free standing liquid membrane to replenish liquid due to evaporation and/or loss due to wetting of objects passing through the membrane.

It is believed that the physical phenomena of whether an object passes through a free standing membrane can be explained as follows. When a particle of given inertial and surface properties impacts a film, it does so with a certain kinetic energy $E_u$. Upon impact, the liquid membrane begins to stretch, thus converting some kinetic energy into membrane surface energy $E_s$. Other dissipative effects may lead to additional energy loss $E_x$ (e.g., energy loss due to film pinning at the particle-membrane boundary $E_p$). The ratio of converted/dissipated energy to the initial kinetic energy of the system can be represented by E*.

A simple free standing liquid membrane can be prepared by mixing deionized water with varying concentrations of surfactant (e.g., sodium dodecyl sulfate, SDS). Subsequently, an opening such as a solid ring can be used to support a free-standing liquid membrane. By varying the concentration of surfactant (e.g., sodium dodecyl sulfate, SDS), the film's surface tension can be adjusted from ~35 mN/m to ~72 mN/m. When two spheres with identical materials properties but of different size, $R_1$ and $R_2$, where $R_1 > R_2$, are released from a fixed height H onto a liquid membrane with surface tension γ, one will notice that at certain values of H the larger sphere will pass through the membrane and the smaller sphere will be retained within the membrane.

Figures 2A, 2B:
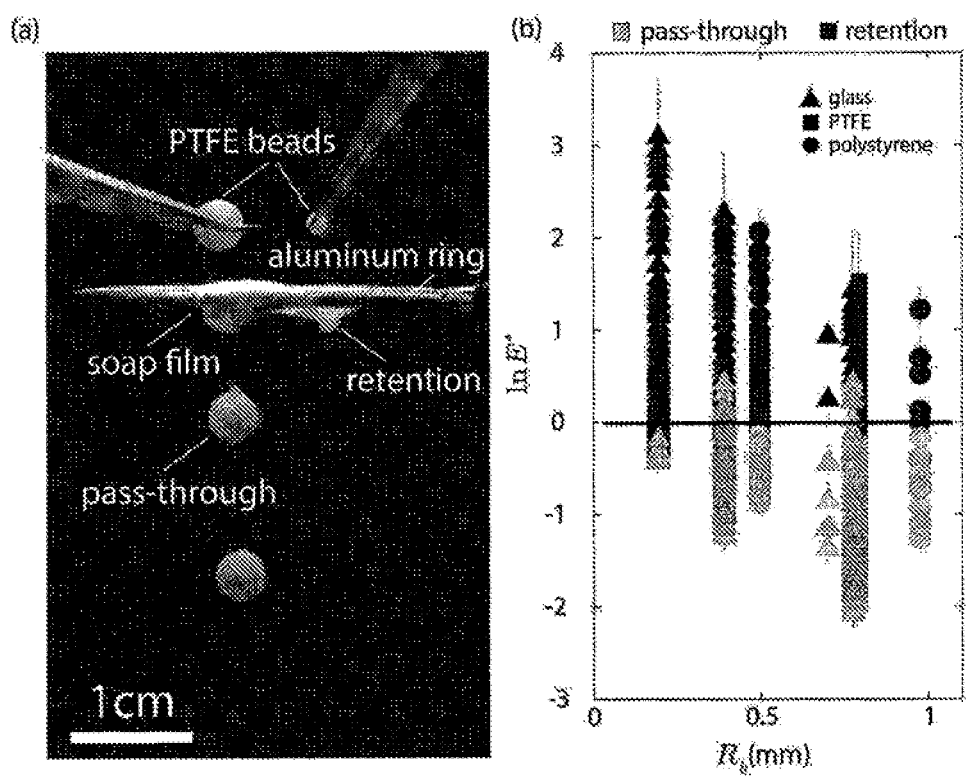
FIGS. 2a and 2b illustrate particle separation with a free-standing liquid membrane and results thereof.

For example, FIGS. 2a and 2b illustrate particle separation with a free-standing liquid membrane and results thereof. FIG. 2a is an overlay of four time-lapse images extracted from a video capturing two polytetrafluoroethylene (PTFE) beads (one small and one large) dropped onto a free standing liquid membrane at the same time from the same drop height. Tweezers used to hold the beads here were only shown for the image before the beads were released for clarity. FIG. 2b shows data from 649 independent bead drop experiments used to determine the criteria for retention versus pass-through (each marker represents an individual bead drop event and the error bars indicate the possible errors resulting from the measurements of physical parameters in Equation 3 below).

Based on experimental observations as provided in FIGS. 2a and 2b, we can categorize the particle-membrane interactions in two different regimes: (A) the particle retention regime and (B) the particle "pass-through" regime.

To experimentally determine the mechanisms that dictate whether an object such as a particle will pass through or remain in the membrane, we systematically dropped beads into a free standing liquid membrane of given surface tension from different heights and recorded whether the bead was retained in or passed through the membrane. Specifically, we dropped relatively smooth beads (root mean square roughness, ξ<2.5 μm) into a stabilized liquid membrane of given surface tension and radius (1.27 cm-1.5 cm) from heights H ranging from 0.5 cm to 15 cm. Typical particle impact velocities $u_b$ values were <2 m/s. We repeated this experiment using liquid membranes with different surface tension (35 mN/m<γ<72 mN/m), wherein γ represents surface tension. To test for the effect of particle geometry on retention/pass-through, the same set of experiments was conducted for beads of different size (355 μm<$R_b$<4.4 mm). Further testing was carried out using beads comprised of different materials (i.e., glass, polystyrene (PS), and polytetrafluoroethylene (PTFE)) to investigate the effect of surface chemistry on particle-membrane interaction.

To gain physical insights regarding the particle separation mechanism, we compared the magnitudes of the kinetic energy ($E_{u_b}$) of the beads at impact to the other forms of energy, such as the maximum increase in film surface energy due to stretching ($E_S$) and energy dissipation ($E_{diss}$) due to film pinning ($E_P$) at the bead boundary, $$E^* = \frac{E_S + E_{diss}}{E_{u_b}} \qquad (1)$$

Note that in our particular experiments the capillary number Ca was small (i.e., Ca~102) indicating that the viscous effects were less significant than the surface tension effects and were therefore neglected. In addition, it has been shown that the films will form a catenoid shape when slow-moving particles impact liquid films (i.e., Weber Number. We<3200; our particles impacted the membranes at <2 m/s). Therefore, the maximum change in surface energy ($E_s$) due to the film stretching was approximated to be the difference between the maximum area the film can stretch, and the area of the flat film of outer radius $R_f$ and inner radius $R_b$. This change in surface energy can be approximated as:

$$E_s = \pi\gamma\{R_b^2[(\sin h(\phi)+\phi]-2(R_f^2-R_b^2)\} \qquad (2)$$

where $$\phi = 2\ \cosh^{-1}\left(\frac{R_f}{R_b}\right).$$

Furthermore, we estimated the energy loss due to pinning ($E_p$) based an our experimental parameters and found this term to be negligible in our experiments. Therefore. E* can be reduced to the following equation for our experiments:

$$E^* \approx \gamma C/E \qquad (3)$$

where $C=\pi\{R_b^2[\sin h\ \phi+\phi]-2(R_f^2-R_b^2)\}$ is a geometry term and γ represents surface tension. Conceptually, Equation (3) is the ratio of energy converted to surface energy and the kinetic energy at impact. It is important to note that E* accounts for shape deformation of a liquid membrane that is not captured by the conventional Weber number—a dimensionless number typically representing the relative importance of the kinetic energy of an impacting liquid droplet and its surface energy. Based on 649 independent bead dropping experiments, we generally observe that particles are retained when E*>~1 and pass through when E*<~1 for all particle surface chemistries used here (FIG. 2b), provided that the weight $F_g$ of the bead does not exceed the capillary force the film can exert on the bead ($F_\gamma$) (i.e., $F_g<F_\gamma$; we note that Equation (3) may not be applicable when aggregation of smaller particles occurs, creating an effectively large particle, which could lead to $F_g>F_\gamma$). In other words, there is an E* value that separates the particle retention and particle pass through regimes and that describes the conditions under which a particle will pass through or be blocked by the membrane. This further highlights that the particle separation physics of a liquid membrane are different from that of a solid membrane. Therefore, E* can be used as a simple criterion to categorize the particle separation regimes of the liquid film for smooth beads with negligible dissipation effects.

We can therefore determine whether a particle will be retained within or will pass through a free standing liquid membrane based on the calculated value of E*. We can also design the liquid membranes to achieve the desired particle selectivity. For example, given a standard geometry, with all other parameters fixed, increasing the membrane ring size will slightly increase the critical particle size $R_{b,cr}$ (i.e., the maximum bead size that can be retained within the film). If instead the surface tension were tuned, increasing the liquid membrane surface tension would increase $R_{b,cr}$. Increasing the particle impact velocity (or, if dropped into the membrane from a given height, increasing the drop height) would lead to a decrease in $R_{b,cr}$.

Longevity of Liquid Membranes

In order for liquid membrane filtration to be viable in a number of applications, liquid membranes must have lifetimes appropriate for the applications of interest. In this regard, membrane fluid reservoirs can be incorporated into the liquid membranes to prevent membrane dehydration by replenishing the membrane and thus preventing breakage of the membrane. Furthermore, additional substances such as hygroscopic agents (e.g., glycerol) can be incorporated into the liquid membrane to significantly reduce evaporation of the liquid—a mechanism by which liquid membranes may rupture. Optimization methods such as genetic algorithms may be used to generate a liquid membrane with the desired longevity and robustness. In certain embodiments, the free standing liquid membrane can remain intact for several seconds, e.g., 15 seconds, 30 seconds or more, and even for many minutes, e.g., at least 5 minutes, 10 minutes, 60 minutes and even several hour such as at least 2 hours, 5 hours, 7.5 hours or even at least 12 hours, with or without a membrane fluid reservoir, while sustaining greater than at least 2, 5, 10, 100, 500 or even at least 1000 perturbations. e.g. objects passing through the membrane.

Most applications for free-standing liquid membranes could only be realized if the membranes remain intact in the presence of perturbations expected in the application of interest over desired time frames. For example, typical surgical time for knee replacements is on the order of 2-3 hours whereas typical defecation durations for humans are on the orders of seconds (diarrhea) to an hour (constipation). In cases where evaporation or fluid loss due to wetting on impacting solids limits membrane longevity, membrane lifetime can be enhanced by using reservoirs for fluid replenishment. We have shown that with a liquid reservoir the hydrated liquid film can sustain >3000 cycles of film perturbations (over three hours) without rupture. One may also tailor the composition of the liquid film by incorporating a number of hygroscopic molecules and other additives to maximize longevity without liquid replenishment.

As a demonstration, we used a genetic algorithm to develop liquid membrane compositions. Specifically, we used differential evolution on mixtures comprised of deionized water, glycerol, sodium dodecyl sulfate (SDS), tannic acid (tannin), and polyethylene oxide (PEO) and used the average longevity (i.e., time between film formation to film rupture) for the selection phase of the genetic algorithm. Some of these components (glycerol, tannic acid, and PEO) are well-known hygroscopic agents. Based on these chemical components, we were able to generate a liquid membrane composition that lasted for an average of 64 min (25 measurements) with a maximum observed longevity of 6.5 hours under room conditions (temperature of 22.3° C., 49% relative humidity) without liquid replenishment. Examples of compositions for long-lasting liquid membranes (without replenishment) are given in Table 1. Therefore, it is possible to optimize the film compositions to create long-lasting membranes using advanced experimental design methods to meet various application requirements.

TABLE 1

| Water (% wt.) | Glycerol (% wt.) | SDS (% wt.) | Tannin (% wt.) | PEO (% wt.) | Average Longevity (s) | Maximum Longevity (s) |
|---|---|---|---|---|---|---|
| 20.6346 | 77.0988 | 0.3716 | 0.1863 | 0.0083 | 3886.4 | 23640 |
| 20.3903 | 77.0754 | 0.3277 | 0.1660 | 0.0204 | 2729.2 | 19260 |
| 20.5840 | 77.8076 | 0.0827 | 0.0830 | 0.0144 | 2417.5 | 7940 |
| 20.3753 | 77.0185 | 0.3256 | 0.2441 | 0.0204 | 2162.1 | 27000 |
| 20.0421 | 77.6490 | 0.2884 | 0.0822 | 0.0144 | 2067.1 | 27000 |
| 20.6069 | 77.9017 | 0.3324 | 0.3306 | 0.0083 | 2029.2 | 14350 |
| 43.8207 | 55.2141 | 0.0438 | 0.0449 | 0.0088 | 1537.3 | 25560 |
| 9.9480 | 87.7415 | 0.2813 | 0.0388 | 0.0199 | 1443 | 4140 |
| 43.4959 | 54.8046 | 0.0876 | 0.0881 | 0.0152 | 1264.5 | 10320 |

Additional Unique Features of Liquid Membrane:

Not only can liquid membranes allow for unique separation (i.e., allowing large particles to pass though while retaining small ones), they also have capabilities characteristic of liquids lending liquid membranes additional application potential. For example, liquid membranes allow for in-membrane object maneuverability and transportation of retained particles by gravity or other effects, capabilities that conventional membranes do not readily exhibit. Moreover, liquid membranes can be transparent which may be desirable for a number of applications.

From a materials design perspective, the above criterion allows us to design a membrane (i.e., $\gamma$ and $R_f$) that can retain particles smaller than a critical size given the inertial properties of the impacting particles (i.e., $\rho_a$ and $u_b$). This capability can also be extended from simple particles to living organisms. For example, the typical speeds of certain air particulates such as pollen or dust (with densities <2 g/cm) is <1 m/s; using these values, we predict that objects of size <1 mm can be retained in the 35 mN/m membrane designed in our experiments (R=1.5 cm).

Figures 3A, 3B, 3C:
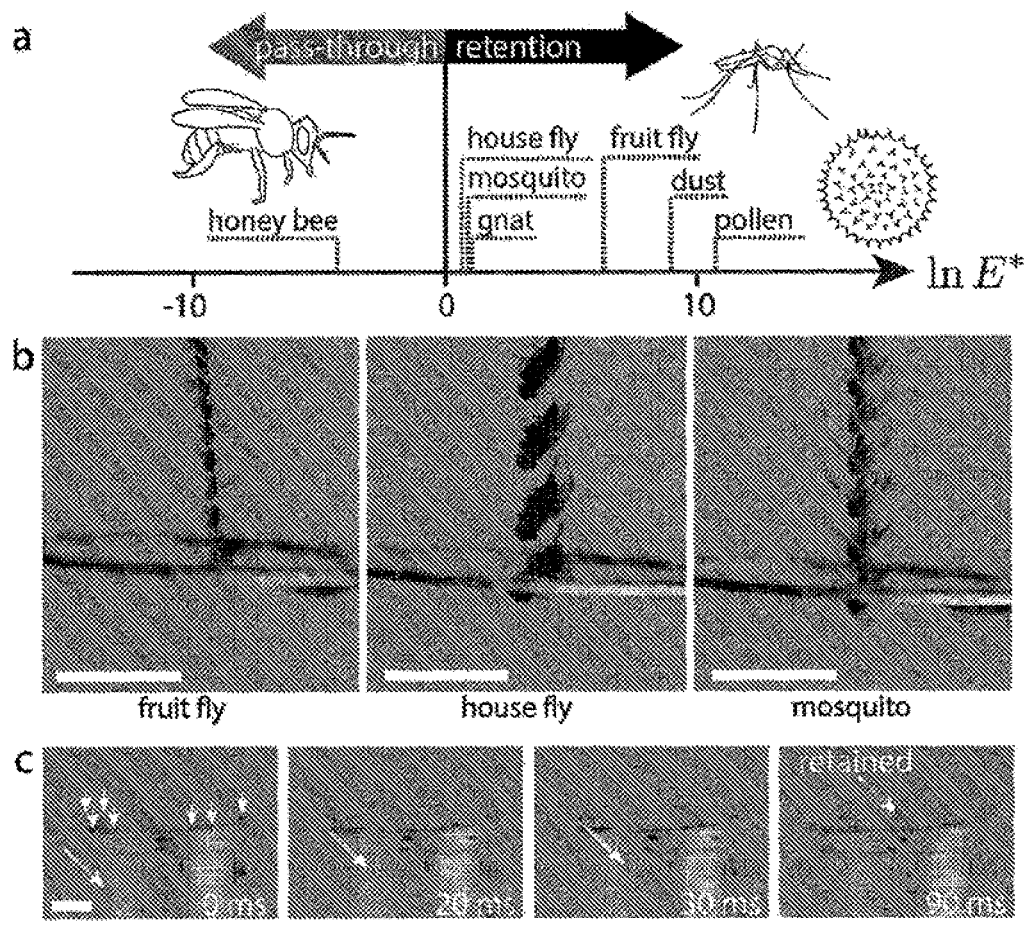
FIGS. 3a, 3b and 3c show how a free standing liquid membrane can be used as a selective barrier.

In a general example, FIGS. 3a, 3b and 3c show how a free standing liquid membrane can be used as a selective barrier. FIG. 3a is plot showing organism types that can pass through (or be retained by) a specified liquid membrane (i.e., 1.5 cm radius, ~35 mN/m surface tension) according to the value of E* based on the characteristic size, locomotion speed, and mass or density of the organism of interests. FIG. 3*b* are images showing retention of fruit flies (*Drosophila hydei*), house flies (*Musca domestica*), and mosquitos (Culicidae (*Diptera*)) by the liquid membranes at impact speeds of ~0.5 m/s, ~1.1 m/s, and ~0.9 m/s respectively. Here, dead insects are used in an effort to control the impact velocity of the insect FIG. 3*c* is a time series of a live fruit fly flying into a free standing liquid membrane: In the left panel, the short arrows are pointing to fruit flies that have already been trapped in the membrane and the long arrow is pointing to the fruit fly of interest. In the next two panels we see the fruit fly of interest flying up into the membrane, where it is retained in the last panel. All scale bars represent 1 cm.

In this example, micro/nanoscopic panicles and contaminates (e.g., pollen), as well as certain slow-moving, disease-carrying insects (e.g., mosquitos and gnats) would not pass through the liquid membrane (FIG. 3a). We have further verified this prediction by dropping a number of relevant insects (i.e., fruit fly, house fly, and mosquito) at their typical locomotion speeds at impact (FIG. 3b). Note that dead insects were used in these experiments in order to ensure the impact speed is near the cruising speed of their live counterparts. To further demonstrate the effectiveness of these liquid membranes in retaining live flying insects, we allowed live fruit flies (wild-type Drosophila melanogaster Canton Special) to interact with a liquid membrane. This demonstration showed that liquid membranes can effectively prevent the passage of flying fruit flies (FIG. 3c).

In addition to the unique kinetic energy selectivity of liquid membranes, their mobile liquid interface offers unique capabilities that cannot be readily accomplished by any conventional synthetic membranes, including in-membrane object maneuverability and transport of retained particles by external forces. These simple yet unique capabilities of the free-standing liquid membranes lend them the ability to provide out-of-the-box solutions to various problems, such as blocking contaminants for open surgery in regions where a dust-free space for safe surgical care is limited, serving as an insect barrier, or other applications involving blockage of small objects while allowing passage of large ones.

As a demonstration of one such application, we showed that a free standing liquid membrane can block contaminants during simulated surgical procedures without inhibiting visibility or maneuverability and can actively collect and remove contaminants.

Figures 4A, 4B, 4C, 4D:
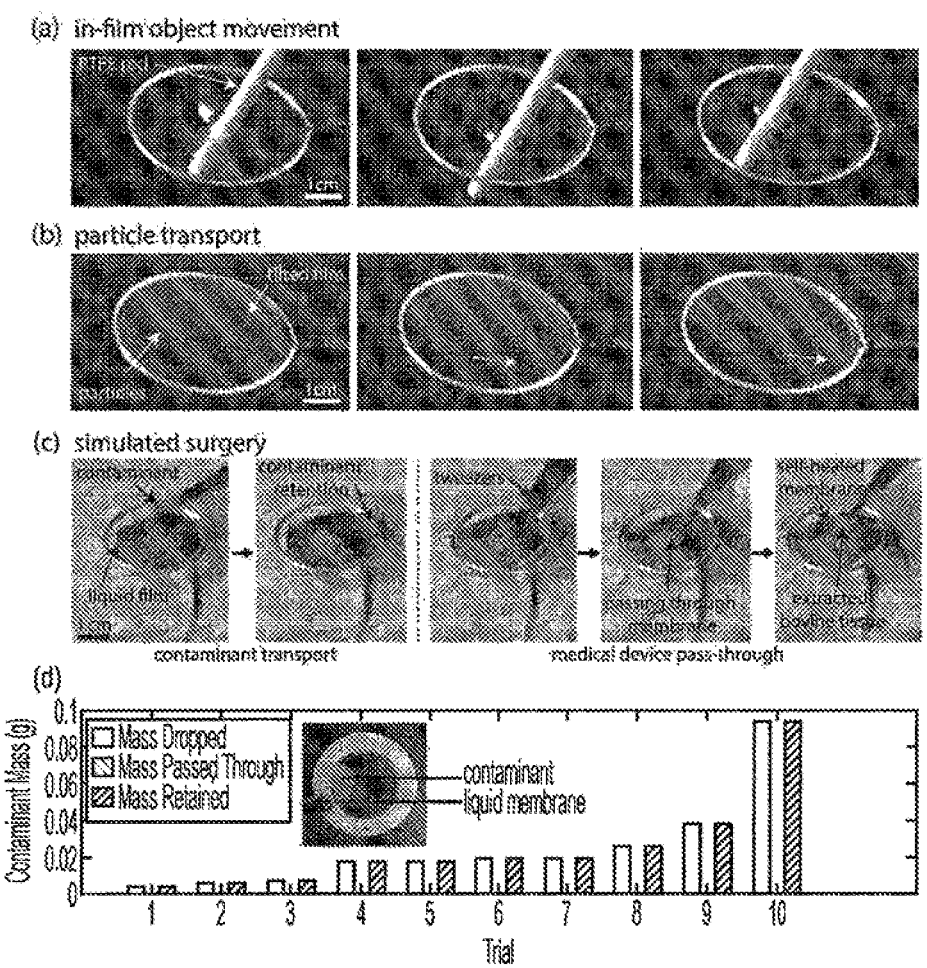
FIGS. 4a, 4b, 4c and 4d are images and a plot to show how a free standing liquid membrane of the present disclosure can be used to retain contaminates in a simulated surgical procedure. All scale bars represent 1 cm.

Unlike solid membranes, objects embedded in the liquid membranes can move freely in the plane of the membrane due to the mobility of the liquid molecules. FIG. 4a shows images of a PFTE rod with contaminates being passed through a free standing liquid membrane and FIG. 4b shows images of retained particle contaminates from the rod. The particles retained in the film can also move within the plane of the liquid membrane, allowing them to be transported away if needed (FIG. 4b). Note also that these particular liquid membranes are transparent, allowing them to be used in applications requiring through-film visibility. FIG. 4c demonstrates that the liquid membrane can block contaminants during simulated surgical procedures without inhibiting visibility or in-film maneuverability and can passively and continuously collect and remove contaminants. FIG. 4d is a plot showing the retention of various amounts of contaminants on a liquid membrane. Note that in all of the trials, no measurable amount of contaminants was leaked through the membranes and therefore no data is shown for the red data bar representing "mass passed through". The contaminant was different quantities of fluorescent powder (the same as that used in (c)) sprinkled from a drop height of ~1 cm. All scale bars represent 1 cm.

In our demonstration, we were able to manipulate surgical tools within the membrane and pass bovine flesh from the simulated surgical opening through the membrane. Meanwhile, particles introduced to the films were trapped and diverted to the edge of the film due to the mobility of the liquid interface. In addition, we have shown that these liquid membranes can successfully prevent contaminants from passing through (FIG. 4d).

Figure 5:
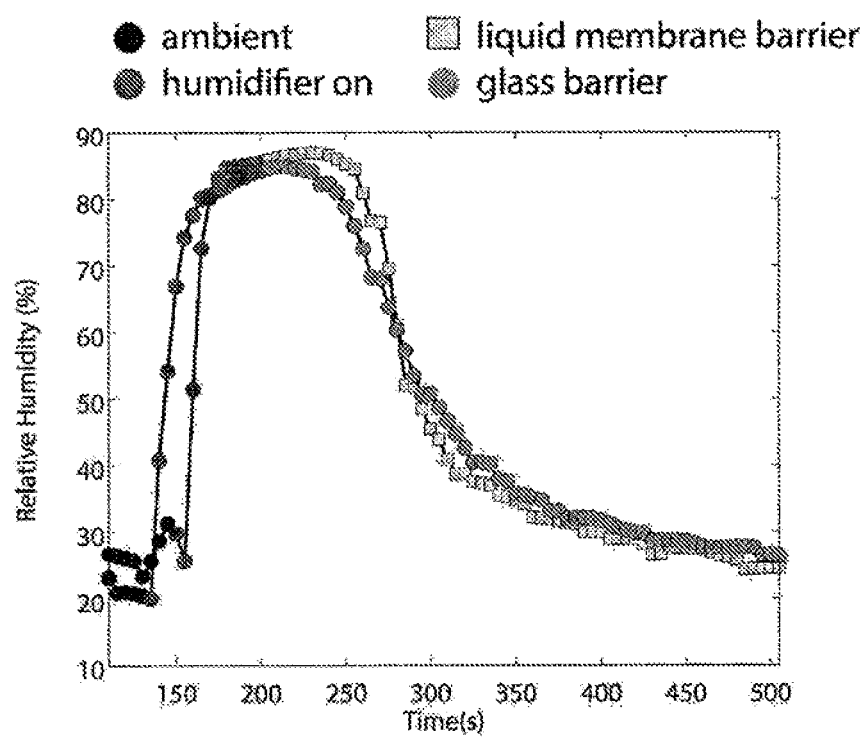
FIG. 5 is a plot comparing the detected relative humidity over time for a free standing liquid member compared to a glass barrier.

Another aspect of the free standing liquid membranes of the present disclosure, is to serve as a gas diffusion barrier while allowing macroscopic objects to pass though. Here, a gas diffusion barrier refers to a material that decreases the diffusivity of a gas compared to its diffusivity in air. This capability could be useful as a simple solution for solid waste/odor management in odor-concentrated environments (e.g., waterless toilets). For example, making waterless toilets attractive from an olfactory perspective is an important factor towards addressing open defecation practiced by ~1.1 billion people (as of 2015). Because liquid membranes can significantly decrease the rat of diffusion of chemicals relevant in waterless toilets, they are an inexpensive solution towards addressing the open defecation problem. To demonstrate the use of liquid membranes for the sequestration of gas while allowing passage of solids, we used fog produced by a humidifier to simulate and visualize gas, and used a suspended liquid film to block the fog while allowing solid objects to pass through. Humidity measurements taken above an intact liquid membrane show that a liquid membrane can be as effective as an impermeable glass substrate (control) in blocking fog passage (FIG. 5). Note that the liquid membrane compositions can be further tailored to reduce the diffusion of specific gases. For example, free-standing liquid membrane composed of water, glycerol, and sodium dodecyl sulfate can effectively reduce the diffusion of gaseous hydrocarbons under room conditions.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Surface Tension and Density of Soap Solution:

The surface tension $\gamma$ of the liquid membranes as a function of concentration of sodium dodecyl sulfate (SDS) can be determined as provided in Table 2 below.

TABLE 2

| [SDS] (M) | Surface Tension (mN/m) | Density (kg/m$^3$) |
| --- | --- | --- |
| .0000 | 72.1 ± 0.4 | 1001.5 ± 3.2 |
| .0019 | 60.2 ± 0.3 | 997.7 ± 5.8 |
| .0026 | 55.0 ± 0.2 | 991.5 ± 2.9 |
| .0037 | 48.9 ± 1.2 | 987.7 ± 9.6 |
| .0045 | 48.4 ± 0.3 | 994.9 ± 7.5 |
| .0053 | 44.8 ± 0.4 | 990.8 ± 6.4 |
| .0062 | 41.6 ± 0.2 | 991.0 ± 9.6 |
| .0071 | 39.4 ± 0.2 | 985.9 ± 12.6 |
| .0079 | 36.8 ± 0.3 | 974.5 ± 11.2 |
| .0087 | 35.6 ± 0.2 | 966.6 ± 3.6 |
| .0096 | 35.4 ± 0.2 | 971.2 ± 12.3 |
| .0106 | 35.6 ± 0.1 | 965.2 ± 1.9 |

Those measurements were obtained using the pendant drop method with a Ramé-Hart goniometer and DropImage software or DropSnake software. See Stalder et al., "A snake-based approach to accurate determination of both contact points and contact angles", *Colloid surfaces A Physicochem. Eng. Asp.* 286, 92-103 (2006). The density $\rho_f$ of each soap solution was determined by measuring the mass of a given volume of the solution. The results are also shown in Table 1.

Mass and Thickness of Liquid Membrane:

In an effort to understand variation between individual liquid membranes, we measured the mass m of 5-10 freshly formed liquid membranes. As a rough estimate of liquid membrane thickness, the membrane of volume V and density $\rho_f$ was assumed to be a thin cylinder with a radius $R_f$ (the ring radius). With this in mind, the film thickness τ was calculated as follows:

$$\tau = \frac{m}{\rho_f \pi R_f^2}$$

Estimated initial film thicknesses based on this equation are shown in Table 3 below. This estimation represents an upper bound of the initial film thickness here since some liquid volume may be collected near the film perimeter due to wetting of the liquid on the hydrophilic aluminum ring.

TABLE 3

| Ring Radius (cm) | [SDS] (M) | Film Mass (mg) | Thickness (μm) |
|---|---|---|---|
| 1.5 | 0.0104 | 47.9 ± 5.5 | ~70 |
| 1.27 | 0.0087 | 20.2 ± 6.5 | ~40 |

Bead Roughness:

Roughness measurements of the beads used in our experiments and of flat surfaces used for contact angle measurements were performed using an optical profilometer (Zygo NexView 3D). Here, roughness ξ is defined as the root mean square roughness. Using this instrument, we conducted roughness measurements on six different regions of both flat and spherical samples of PTFE, polystyrene, and glass. The average and standard deviation of these 6 values of f are shown in Table 4.

TABLE 4

| Material | ξ (μm) | Scan Area (μm × μm) | Manufacturer |
|---|---|---|---|
| Glass (sphere; soda lime) | 0.301 ± 0.019 | 836 × 836 | Cospheric |
| glass slide (flat; borosilicate) | 0.002 ± 0.000 | 836 × 836 | VWR |
| PTFE (sphere) | 1.082 ± 0.033 | 836 × 836 | McMaster-Carr |
| PTFE (flat) | 0.702 ± 0.197 | 836 × 836 | McMaster-Carr |
| PS (sphere) | 2.225 ± 0.036 | 773 × 773 | Cospheric |
| PS (flat) | 0.650 ± 0.006 | 836 × 836 | McMaster-Carr |

Wetting Characteristics of Soap Solution on Bead Material:

Contact angle measurements of soap films on flat surfaces comprised of materials chemistry similar or identical to that of the heads used in our experiments were used to approximate the energy loss due to pinning. To approximate the energy dissipation associated with pinning, both advancing and receding contact angle values are required. Since the surface roughnesses of our flat surface samples are smaller than those of the beads (Table 4), the measured receding angles on the flat substrate would lead to an underestimate of the energy dissipation due to liquid pinning. In order to calculate the upper bound values of the pinning energy for an order of magnitude comparison, we have assumed the receding angles to be zero in all cases (i.e., $\theta_R = 0°$). The experimentally measured advancing angles are shown in Table 5.

TABLE 5

| [SDS] (M) | $\theta_A(°)$ PTFE | $\theta_A(°)$ PS |
|---|---|---|
| .0000 | 129.2 ± 1.7 | 97.2 ± 1.8 |
| .0019 | 119.3 ± 3.8 | 83.4 ± 2.1 |
| .0026 | 111.8 ± 3.8 | 78.9 ± 2.7 |
| .0037 | 118.0 ± 1.2 | 71.3 ± 3.8 |
| .0045 | 108.2 ± 7.1 | 72.3 ± 1.2 |
| .0053 | 116.8 ± 0.6 | 65.4 ± 2.5 |
| .0062 | 102.8 ± 1.4 | 60.2 ± 3.0 |
| .0071 | 101.9 ± 5.2 | 64.0 ± 0.9 |
| .0079 | 101.8 ± 8.0 | 57.4 ± 2.9 |
| .0087 | 94.8 ± 0.3 | 61.6 ± 1.9 |
| .0096 | 95.3 ± 1.4 | 53.3 ± 1.4 |
| .0106 | 87.8 ± 5.0 | 50.8 ± 2.1 |

Inertial Characteristics of Living Organisms and Particles:

In FIG. 3a, we calculated the value of E* based on the mass or density, characteristic size, and typical speed reported for each organism/particle. We assumed that the film had a radius of $R_f = 1.5$ cm and the surface tension was 35.6 mN/m (i.e., the smallest surface tension we tested). We conducted house fly size and mass measurements, which are shown in Table 6. The rest of the data we used for this plot is shown in Table 7. Insects used for measurements and for the insect dropping tests shown in FIG. 3b were all purchased from DeadInsects.Net.

TABLE 6

| House Fly | Size (m) | Mass (kg) |
|---|---|---|
| 1 | 6.4 × 10−3 | 1.5 × 10−6 |
| 2 | 5.2 × 10−3 | 1.0 × 10−6 |
| 3 | 5.9 × 10−3 | 1.7 × 10−6 |
| 4 | 5.4 × 10−3 | 1.3 × 10−6 |
| 5 | 4.5 × 10−3 | 1.0 × 10−6 |
| 6 | 5.7 × 10−3 | 1.6 × 10−6 |
| 7 | 5.7 × 10−3 | 1.5 × 10−6 |
| 8 | 5.2 × 10−3 | 1.2 × 10−6 |
| 9 | 6.2 × 10−3 | 2.3 × 10−6 |
| 10 | 5.1 × 10−3 | 1.2 × 10−6 |
| Average | 5.5 × 10−6 | 1.4 × 10−6 |
| Standard Deviation | 0.6 × 10−6 | 0.3 × 10−6 |

TABLE 7

| Organism/Particle | Characteristic Size (m) | Speed (m/s) | Mass (kg) | Density (kg/m³) | In ($E_s/E_{u\_b}$) |
|---|---|---|---|---|---|
| pollen | 3.1 × 10−5 | 4.01 × 10−2 | — | 1435 | 11 |
| dust | 5 × 10−5 | 7 × 10−2 | — | 1550 | 9 |
| fruit fly | 3 × 10−3 | 2 × 10−1 | 3.04 × 10−7 | — | 6 |
| mosquito | 3 × 10−3 | 1.18 | 2 × 10−6 | — | 1 |
| gnat | 1.68 × 10−3 | 3 | 1 × 10−4 | — | 1 |
| house fly | 5.5 × 10−3 | 2.7 | 1.4 × 10−6 | — | 1 |
| honey bee | 1.1 × 10−2 | 7 | 8 × 10−5 | — | −4 |

Humidity Sensing:

The relative humidity of the space about 3 ca above the humidifier (Crane Ultrasonic Cool Mist) outlet was measured over time (every 5 sec) to compare the local relative humidity in the presence and absence of a liquid membrane or a glass dish (control). Sine the humidifier causes a flow of air, a side-facing exit of the piping was needed to prevent the liquid membrane from forming a bubble.

Genetic Algorithm:

In an effort to demonstrate how liquid membranes can be tailored to meet the needs of various applications, we used a genetic algorithm called differential evolution, discussed by Storn and Price and has been successfully implemented in a number of experimental studies. See. Storn et al., "Differential Evolution—A Simple and Efficient Heuristic for Global Optimization over Continuous Spaces", *J. Glob. Optim.* 11, 341-359 (1997) and Tsutsui et al., "An optimized small molecule inhibitor cocktail supports long-term maintenance of human embryonic stem cells", *Nat. Commun.* 2, 167 (2011)

With this method, we used the glycerol-to-water ratio, mass of surfactant, mass of polyethylene oxide, and mass of tannic acid (Cook. "Tough soap films and bubbles", *J. Chem. Educ.* 15, 161 (1938)), as vector components and average soap film longevity as the output for selection. We measured the longevity of 72 different compositions. For each of those compositions, we formed up to 59 membranes in parallel for statistical purposes and measured their longevity. The total volume of the solutions was kept constant (40 mL). These additives were chosen because of their hygroscopic properties.

Genetic Algorithm.

A free standing liquid membrane can be comprised of various different components. Different formulations may have different properties. For example, one composition may have longer lifetime than others. In an effort to create a long lasting liquid membrane, we use a genetic algorithm called differential evolution (Storn and Cook, 1938). For our experiments, we used deionized water, glycerol, tannic acid, polyethylene glycol, and sodium dodecyl sulfate as components of the liquid membranes and selected for average liquid membrane longevity. Our search space was limited and coarse: too large of a search space or too fine of a search space (i.e., too many potential concentrations of a given component) would mean more iterations until convergence. Our component search ranges were as follows:

| Component | Concentration Range and coarseness (minimum concentration:interval:maximum concentration) |
|---|---|
| deionized water | 0 mL:5 mL:40 mL |
| Sodium dodecyl sulfate | 0 mM:1.7 mM:15.6 mM (0 g:0.02 g:0.18 g in 40 mL solution) |
| Tannic add | 0 mM:0.3 mM:2.9 mM (0 g:0.02 g:0.2 g in 40 mL solution) |
| PEO | 0 g:.09 g:1.0 g in 40 mL solution |
| Glycerol | Volume of glycerol = 40 mL − volume of deionized water |

The search for the composition with the longest average longevity had 5 components per generation (NP=5), with 4 components (D=4; glycerol not considered, alone, as its volume is dependent on the water volume). The first generation of components was determined by random number generation for each component. To determine the next generation, we used the equations outlined by Storn and Cook, using a crossover constant of 0.5 (CR=0.5) and a "jump length" of 0.5 (F=0.5) to generate a set of test compositions. We then compared how each composition $X_{i,G}$ (i=1, 2, . . . 0, G denotes the generation) compared to the test vector $U_{i,G}$. Generation $X_{i,G+1}$ was determined to be either $X_{i,G}$ or $U_{i,G}$: the composition with the higher average longevity was chosen to be $X_{i,G+1}$. Note that it is possible to select for other properties to achieve a liquid membrane of interest. For example, instead of selecting for average longevity, it is possible to select for maximum longevity, number of perturbations before rupture, bactericidal effectiveness, or other properties desired of the liquid membrane.

Liquid Membranes as Selective Solid/Gas Filters.

A free standing liquid membrane can serve as a gas diffusion barrier while allowing macroscopic objects to pass through (e.g., odor management). The free standing liquid membrane of this experiment was composed of deionized water and 8.6 mM sodium dodecyl sulfate. A fog generator was used in the experimental setup in assessing the ability of a liquid membrane (barrier) to prevent the passage of fog. Quantitative measurements shown in FIG. 5 demonstrate that the free standing liquid membrane can be as effective as a solid glass barrier in blocking the fog passage.

Longevity and Mechanical Perturbation of a Liquid Membrane.

A free standing liquid membrane was mechanically perturbed by a glass rod. The free standing liquid membrane of this experiment was composed of water, glycerol and sodium dodecyl sulfate. A time sequence of images showing the mechanical pertubation of a liquid membrane by a smooth glass ad was captured. Probing took place at a period of 3.55 s over 3042 cycles. The membrane liquid was replenished at a rate of ~1-2 mL/min by a reservoir containing water, glycerol and sodium dodecyl sulfate. It was replenished using a syringe filled with a liquid solution identical to the liquid membrane solution; the liquid in the syringe was gradually and automatically released into the free standing liquid membrane through a needle that was just above the membrane. We note that the glass rod is hydrophilic so some liquid from the membrane wets its surface as it passes into the membrane repeatedly. The free standing liquid membrane was maintained under these conditions for >3 hours demonstrating that a free standing liquid membrane in accordance with the present disclosure can be maintained for hours with repeated mechanical perturbations.

While the claimed invention has been described in detail and with reference to specific embodiments thereof, it will be apparent to one of ordinary skill in the art that various changes and modifications can be made to the claimed invention without departing from the spirit and scope thereof. Thus, for example, those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A method of selectively separating objects, the method comprising
    passing a first object having a first kinetic energy value through a free standing liquid membrane while retaining the membrane and/or preventing a second object having a second kinetic energy value from passing through the membrane while retaining the membrane; wherein the first kinetic energy value is greater than the second kinetic energy value; and wherein the free-standing liquid membrane comprises at least one liquid and at least one surfactant.

2. The method of claim 1, comprising passing the first object through the free standing liquid membrane while retaining the membrane to prevent the second object from passing through the membrane.

3. The method of claim 1, comprising preventing the second object from passing through the free standing liquid membrane while passing the first object through the free standing liquid membrane while retaining the membrane.

4. The method of claim 1, comprising preventing any one or combination of a small molecule, virus, germ, dust, insect from passing through the membrane and passing a macroscopic tool through the membrane.

5. The method of claim 1, comprising preventing a gas from passing through the membrane while passing a non-gaseous object through the membrane.

6. The method of any one of claims 1-5, comprising passing multiple objects through the free standing liquid membrane and/or preventing multiple objects from passing through the free standing liquid membrane.

7. The method of any one of claims 1-5, comprising replenishing the at least one liquid of the free standing liquid membrane.

8. The method of any one of claims 1-5, wherein the free standing liquid membrane can remain intact for at least 5 minutes with at least 10 perturbations.

9. A free-standing liquid membrane comprising at least one liquid and at least one surfactant wherein the free standing liquid membrane can remain intact for at least 5 minutes with at least 10 perturbations.

10. The free-standing liquid membrane of claim 9, wherein the liquid is an aqueous fluid.

11. The free-standing liquid membrane of claims 9 or 10, wherein the surfactant is one or more of anionic or nonionic molecules such as sodium dodecyl sulfate, sodium stearate, ammonium lauryl sulfate, sodium laureth sulfate, sodium myreth sulfate, alkylbenzene sulfonates, fatty alcohol ethoxylates, alkylphenol ethoxylates, glycerol monostearate, perfluorooctanesulfonate, perfluorobutanesulfonic acid, perfluoronoanoic acid, perfluorooctanoic acid, perfluorononanoate, perfluorooctanoate, or bio-surfactants such as emulsan, sophorolipid, rhamnolipids.

12. The free-standing liquid membrane of claim 11, comprising an additive selected among one or more of hygroscopic agents, antiseptics, fragrances: sugar, guar gum, glycerol, polyethylene glycol, poly(ethylene oxide), carboxymethylcellulose, sodium bicarbonate, ethanol, hydrogen peroxide, iodine, polyhexanide, citric acid, tannic acid, benzyl salicylate, citral, citronellol, citronellal, or menthol.

13. The free-standing liquid membrane of claim 11, wherein the liquid includes water, the surfactant includes sodium dodecyl sulfate and the additive includes glycerol.

* * * * *